United States Patent [19]

DeAlto et al.

[11] 4,370,908

[45] Feb. 1, 1983

[54] CUTTING HEAD FOR FILTER ASSEMBLER

[75] Inventors: Michael E. DeAlto; Joseph D. DiGiacomo; Clifford R. Marritt, all of Richmond, Va.; Edward G. Preston, London, England

[73] Assignee: Molins Limited, London, England

[21] Appl. No.: 138,092

[22] Filed: Apr. 7, 1980

[30] Foreign Application Priority Data

Apr. 5, 1979 [GB] United Kingdom ................. 7912075

[51] Int. Cl.³ ........................ B23D 25/02; B23D 35/00

[52] U.S. Cl. ........................................ 83/348; 83/677; 83/700

[58] Field of Search ................. 83/348, 677, 699, 700, 83/346, 347, 337, 341

[56] References Cited

U.S. PATENT DOCUMENTS

| | | | |
|---|---|---|---|
| 1,310,922 | 7/1919 | Novick | 83/337 X |
| 2,181,197 | 11/1939 | Moritz | 83/677 X |
| 3,174,372 | 3/1965 | Huck | 83/341 X |
| 3,499,370 | 3/1970 | Kulwicki et al. | 83/348 X |
| 3,828,637 | 8/1974 | Slack | 83/348 |
| 4,240,313 | 12/1980 | Gillespie | 83/677 X |

FOREIGN PATENT DOCUMENTS

| | | | |
|---|---|---|---|
| 878566 | 10/1961 | United Kingdom | 83/348 |
| 934295 | 8/1963 | United Kingdom | 83/348 |

*Primary Examiner*—James M. Meister

*Attorney, Agent, or Firm*—Antonelli, Terry & Wands

[57] ABSTRACT

A cutting head for a filter attachment machine comprises a drum carrying a number of knives each of which is urged radially outwards by at least one spring against an adjustable retaining device by which the normal distance of the cutting edge from the axis of the drum can be adjusted.

5 Claims, 6 Drawing Figures

CUTTING HEAD FOR FILTER ASSEMBLER

This invention is concerned with a cutting head for a filter assembler, which is a machine for making filter cigarettes by joining filter portions to tobacco rods by means of uniting bands. These bands are cut from a web which is often of cork-like appearance and is for that reason usually referred to as "cork".

A common form of cutting head comprises a drum carrying a number of circumferentially spaced knives which cooperate with anvil inserts in a drum carrying the cork web, each cut being achieved by a pinching action. In one common cutting head, each individual knife is pivotally mounted on its carrier drum and is radially adjustable with respect to the axis of the drum. This allows the cutting edge of each knife to be set at a desired distance from the axis of the drum, while the freedom of pivotal motion accommodates any lack of parallelism between the axis of the cutting head drum and that of the drum carrying the cork web.

There are normally fewer knives on the cutting drum than anvils on the cork drum. Accordingly, it is not possible to set each knife so as to take account of any slight variation in regard to the distance of each anvil surface from the axis of the cork drum. Therefore the load of the knives on the anvils can vary, especially if the cork drum is heated.

The same problem arises in connection with the cutting drum described in Molins Limited British Pat. No. 1,469,684, in which each knife is secured to the cutting drum, which is itself universally pivoted on its drive shaft.

According to the present invention a cutting head for a filter attachment machine comprises a drum carrying a number of knives each of which is urged radially outwards by at least one spring against an adjustable retaining device by which the normal distance of the cutting edge from the axis of the drum can be adjusted.

During cutting, each knife moves radially inwards against the action of the spring or springs, which thus provide a controlled cutting force. This controlled force contrasts with prior arrangements in which the cutting force was transmitted through a pivot without inherent flexibility (apart from any flexibility in the shaft supporting the cutting drum) so that an excessive cutting force could arise if the cutting head was incorrectly adjusted in regard to the radial position of one or more knives and/or in regard to the distance of the cutting head from the cork drum.

In one possible form the adjustable retaining device for each knife comprises a spindle lying substantially along a cord of the drum (e.g. midway between the ends of the knife) and having an eccentric portion engaging the knife so that rotation of the spindle alters the normal radial position of the knife (i.e. the position while the knife is not cutting).

Each knife is preferably engaged by two springs at or near its opposite ends. In one possible arrangement according to this invention, a ring of elastic material near each end of the drum serves as a spring engaging all the knives. Alternatively, each knife may have its own separate spring at each end, for example in the form of one or more spring washers.

According to another aspect of this invention, in a cutting head for a filter attachment machine, each knife is located along a spring beam which is resiliently flexed and engages the knife so as to urge it radially outwards; preferably the center of the beam is pivotable on the bottom surface of a slot containing the knife and the beam, or serves as a fulcrum for the knife. Preferably pivotal motion is provided by a rounded projection on the inner surface of the beam serving as a fulcrum; alternatively a fulcrum (possibly in the form of an insert with a rounded head) may be fitted in the bottom of the groove.

During assembly, the beam for each knife may be pre-stressed by a retaining device which displaces the knife radially inwards through a predetermined or adjustable distance. For example, the retaining device may comprise a pin which is inserted through an aperture in the body of the knife and has an eccentric portion which displaces the knife when the pin is rotated about its axis.

Examples of cork cutting heads according to this invention are shown in the accompanying drawings. In these drawings.

Figure 1:
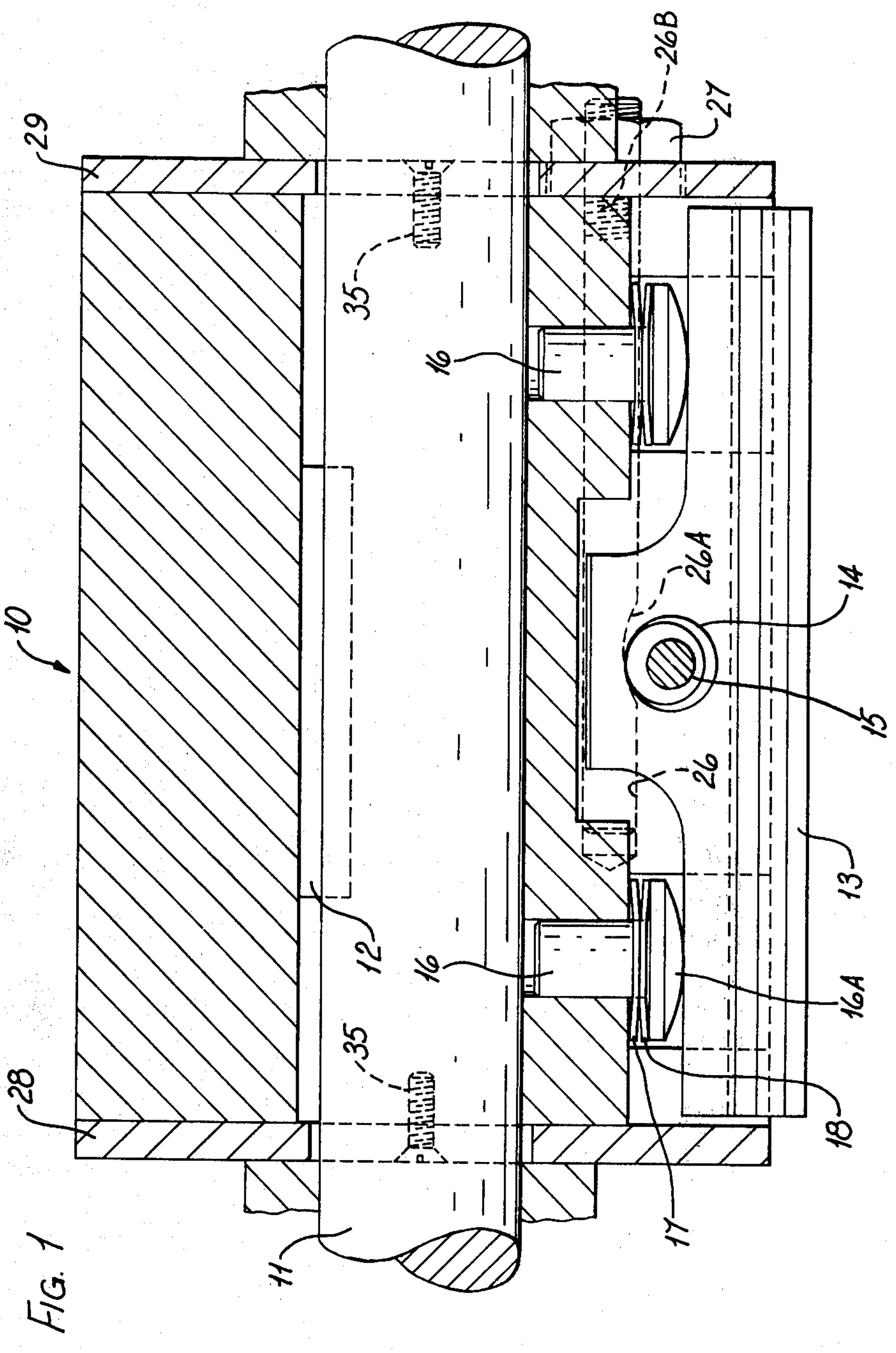
FIG. 1 is a sectional view of one cutting head taken on the line I—I in FIG. 2.
Figure 2:
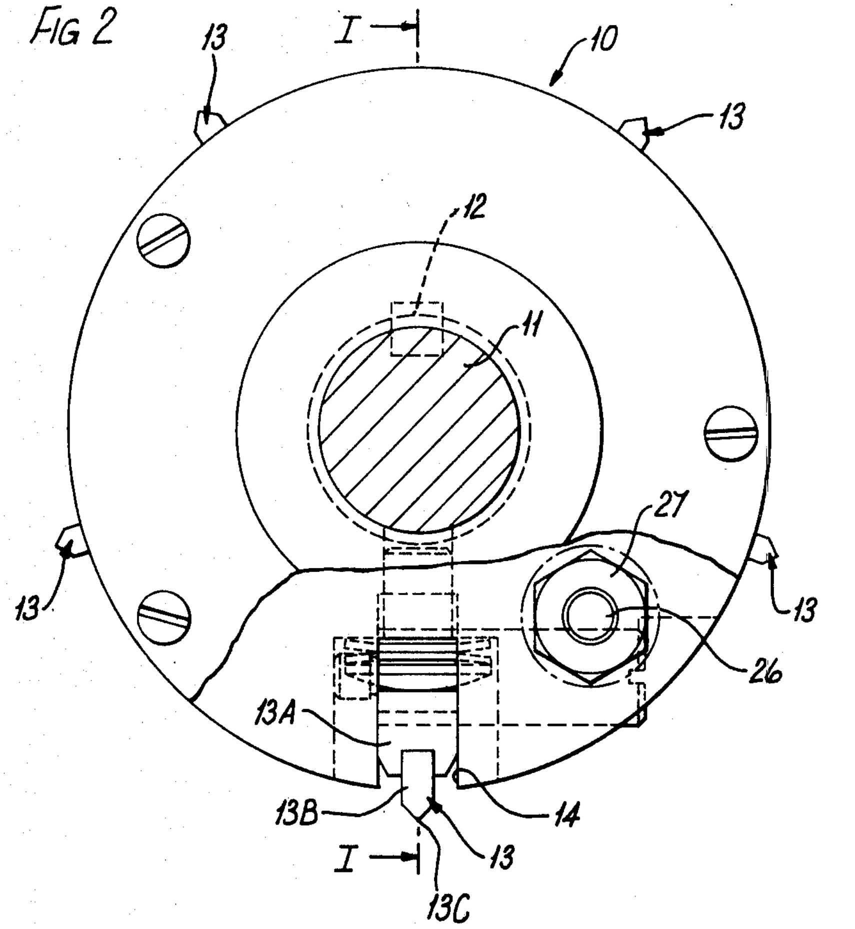
FIG. 2 is an end view of the head shown in FIG. 1, with part of the end plate broken away to show one of the knives.

As shown in FIGS. 1 and 2, the cutting head comprises a drum 10 mounted on a shaft 11 and driven via a key 12. The drum carries five circumferentially spaced knives 13 in radial slots 14, only one knife being shown in FIG. 1.

Each knife, as shown in FIG. 2, comprises a body 13A and an edge member 13B formed with a cutting edge 13C. Midway between the ends of the knife there is a cylindrical aperture 14 through which passes an adjustable retaining device 15 shown more particularly in FIGS. 3 and 4. Near each end of the knife there is a plunger 16 which urges the knife radially outwards through the action of compressed spring washers 17 and 18 engaging between a head 16A on the plunger 16 and a fixed surface of the drum.

Figure 3:
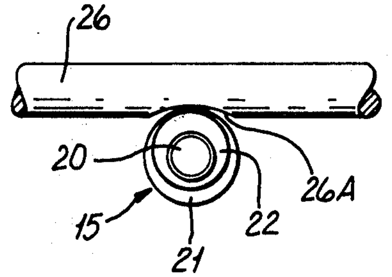
FIG. 3 is an end view of the spindle acting as a retaining device for one knife.
Figure 4:
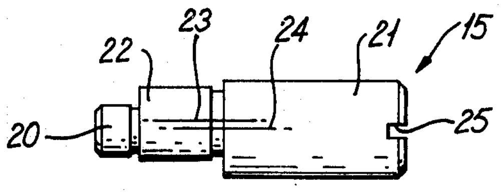
FIG. 4 is a side elevation of the spindle shown in FIG. 3.

As shown in FIGS. 3 and 4, each retaining device 15 comprises a spindle having coaxial small and large diameter end portions 20 and 21 respectively. Between these end portions there is an eccentric cylindrical portion 22 having an axis 23 which is parallel to but offset from the axis 24 of the portions 20 and 21. The drum 10 has appropriate machined bores forming bearings for the portions 20 and 21, while the eccentric portion 22 lies in the slot 14 containing the knife. A slot 25 in the end of the portion 21 allows the device 15 to be rotated by a screwdriver or similar tool.

During assembly, after the plungers 16 have been inserted into the drum, the retaining devices 15 are inserted into position, with the axis 23 of the eccentric portion 22 of each retaining device lying outside the axis 24. After that, rotation of the device 15 in either direction causes the eccentric portion 22 to displace the knife towards the axis of the drum 20 against the action of the spring washers. This allows the normal distance of the cutting edge 13C of each knife from the drum 10 to be adjusted.

It should be noted that the retaining device 15 is shown in the drawings after 180° of rotation, giving the maximum inward displacement of the knife.

Friction tends to prevent inadvertent rotation of the retaining device 15 during use. However, there is a locking device for each retaining device comprising a pin 26 lying parallel to the axis of the drum 10 and capable of engaging and locking the larger diameter portion 21 of the retaining device. As shown in FIGS. 1 and 3, the locking pin 26 has a part-cylindrical recess 26A which receives the side of the portion 21 of the retaining device, and threaded end portion 26B which is engaged by a nut 27. Tightening of the nut 27 pulls the wall of the recess 26A against the retaining device, which is thus locked against inadvertent rotation.

Circular end plates 28 and 29 cover the ends of the drum 10, being secured by screws 35.

The spring washers 17, 18 may be of the type known as Belleville washers. One of the washers of each pair (e.g. washer 18) may have a lower stiffness than the other. For example, the washer 17 may be one requiring approximately 400 lb to flatten it, while the washer 18 may have a flattening load of about a quarter that amount. This allows adjustment of the radial position of each knife to be made against a relatively light spring force. Also, each knife moves radially inwards slightly during cutting against a relatively light spring force before applying a full cutting force through the action of the stiffer washer. In addition, this allows each knife to align itself with the cooperating anvil surface (i.e. in the event it is not exactly parallel to the anvil) against the resistance of a light spring force.

The surface of the head 16 adjacent to the washer 18 may be slightly conical (e.g. with an inclination of 3°40′) so as to prevent complete flattening of the washer 18.

Figure 5:
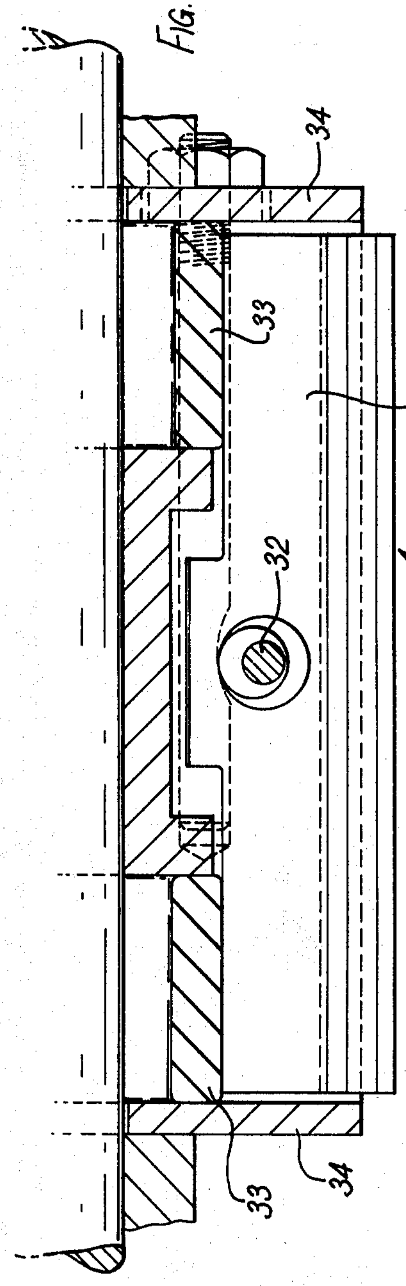
FIG. 5 is a fragmentary section similar to FIG. 1, but of a different form of cutting head.

FIG. 5 shows part of a different form of cutting head 30. This has five knives 31 which are similar to the knives in the previous example, except that the inner surface of each knife body has a slightly different shape as shown. As in the previous example, each knife is held in position by an adjustable retaining device 32 which is identical to the device 15 in the previous example and operates in the same manner.

FIG. 5 differs from the previous example in that, in place of the spring washers, there is a sleeve 33 of urethane rubber or other elastomeric material at each end of the drum. The sleeves 33 fit into annular recesses in the ends of the drum and engage and act upon all the knives. Circular end plates 34 secured by screws to the ends of the drum retain the sleeves 33 in position.

Each sleeve may comprise concentric parts of which the outer part is softer and thinner than the inner part to provide a dual spring rate effect similar to that of the Belleville washers in FIGS. 1 to 4.

As an alternative, in the arrangement shown in FIGS. 1 and 2, the spring washers at each end of each knife may be replaced by a rubber or other resilient pad or by a different form of spring.

Figure 6:
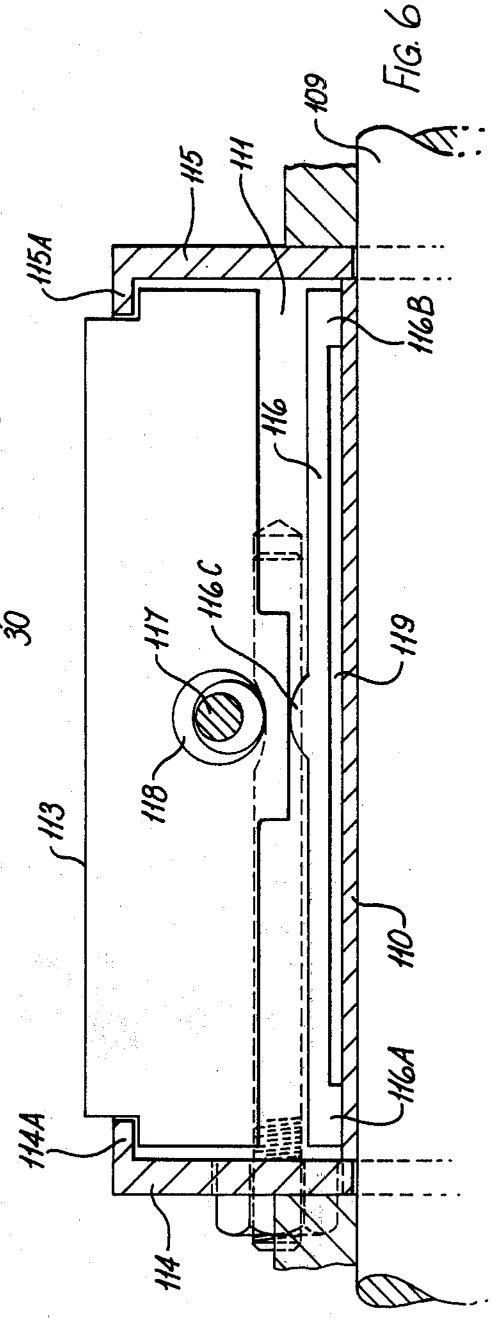
FIG. 6 is similar to FIG. 5, but shows another different cutting head.

FIG. 6 is a longitudinal section through part of a cutting head which comprises a shaft 109 carrying a drum 110 formed with a number of circumferentially spaced longitudinal slots 111 each of which contains a knife body 112 having a cutting edge 113. End plates 114 and 115 on the drum locate the knives, for which purpose they have flanges 114A and 115A engaging over the ends of the knife bodies.

A spring beam 116 (e.g. of spring steel) extends parallel to the knife body and has radial projections 116A and 116B at its ends and a central rounded projection 116C. This last projection serves as a fulcrum on which the knife can pivot relative to the drum to accommodate any lack of parallelism between the knife edge 113 and the surface of the anvil on the cork drum (not shown).

A retaining device 117 projects through an aperture 118 in the knife body, and is similar to the retaining device in the previous examples.

Adjustment of the normal position of the knife (i.e. while it is not cutting) may be achieved by rotating the retaining device through different angles (up to a maximum of 180°); a locking pin may be provided to lock the retaining device in any desired position, as in the previous examples. Alternatively, the retaining device may be arranged to lock only in one position (after 180° of rotation) to provide a predetermined displacement of the knife.

The clearance space 119 between the beam 116 and the bottom of the slot 111 is shown somewhat exaggerated. In practice a smaller clearance may be provided to limit the amount by which the beam can flex to avoid overstressing of the beam.

As an alternative to the arrangement shown, the radial projection 116C may extend inwards to engage the bottom surface 119 of the slot in the drum, in which case the projections 116A and 116B would extend outwards to engage the inner surface of the knife body.

Another possibility is that the central protrusion serving as the fulcrum may be formed or mounted on the knife on the bottom of the slot 111. Projections engaging the ends of the beam may then be formed on the bottom of the slot 111 or on ends of the knife, as the case may be; in that case the beam can be of uniform cross-section along its length.

In each of the above-described embodiments of this invention it is possible to use, instead of a single central retaining device for each knife, a pair of similar retaining devices acting on the knife at longitudinally spaced positions along the knife, e.g. near the respective ends of the knife. Moreover, in place of the dual spring devices, i.e. those near the respective ends of the knife there may be a single central spring device (Belleville washer, rubber sleeve or the equivalent) lying between the two retaining devices.

Each of the retaining devices mentioned above may be modified as follows. The narrow end portion 20 of the spindle is omitted, and the length of the eccentric portion 22 is reduced; the shortened eccentric portion engages in a recess in the knife, instead of passing through the knife.

We claim:

1. A cutting head for a filter attachment machine comprising a drum carrying a plurality of knives each of which is urged radially outwards by at least one spring against an adjustable retaining device which limits radially-outward movement of the corresponding knife and includes adjustment means for adjusting the outer limiting portion of the knife, said spring comprising a resilient beam which extends along a radially-inner face of the knife and is resiliently flexed, and is arranged to engage the knife so as to urge it radially outwards, and further including a central fulcrum about which each knife can pivot with respect to the cutting head.

2. A cutting head according to claim 1 in which the central fulcrum is arranged to permit the knife to pivot with respect to the beam.

3. A cutting head for a filter attachment machine, comprising a drum carrying a number of knives each of which is located along a spring beam which is separate from the knife, is resiliently flexed and engages the knife so as to urge it radially outwards, and including a central fulcrum about which each knife can pivot with respect to the cutting head.

4. A cutting head according to claim 3 in which the central fulcrum is arranged to permit the knife to pivot with respect to the beam.

5. A cutting head for a filter attachment machine, comprising a drum carrying a number of knives each of which has a centrally-disposed pivotal mounting on the drum, which pivotal mounting is carried by said drum so as to be movable radially inwards against the resistance of a spring.

* * * * *